(12) United States Patent
Mullins et al.

(10) Patent No.: US 11,454,321 B2
(45) Date of Patent: Sep. 27, 2022

(54) HYDRAULIC FLUID PUMP AND STUFFING BOX ASSEMBLY FOR SAME

(71) Applicant: GARDNER DENVER PETROLEUM PUMPS, LLC, Tulsa, OK (US)

(72) Inventors: Chance Ray Mullins, Tulsa, OK (US); Peter Ross Ehlers, Tulsa, OK (US)

(73) Assignee: GD ENERGY PRODUCTS, LLC, Tulsa, OK (US)

(*) Notice: Subject to any disclaimer, the term of this patent is extended or adjusted under 35 U.S.C. 154(b) by 639 days.

(21) Appl. No.: 16/400,549

(22) Filed: May 1, 2019

(65) Prior Publication Data
US 2020/0347843 A1 Nov. 5, 2020

(51) Int. Cl.
*F16J 15/18* (2006.01)
*F04B 53/16* (2006.01)
*F04B 1/0448* (2020.01)

(52) U.S. Cl.
CPC .......... *F16J 15/184* (2013.01); *F04B 53/164* (2013.01); *F04B 1/0448* (2013.01); *F16J 15/18* (2013.01)

(58) Field of Classification Search
CPC ........ F16J 15/18; F16J 15/184; F04B 53/164; F04B 1/0448
See application file for complete search history.

(56) References Cited

U.S. PATENT DOCUMENTS

| 2,146,709 | A |   | 2/1939  | Bird et al. |
| 2,312,430 | A |   | 3/1943  | Magnuson |
| 2,321,927 | A | * | 6/1943  | McCoy ............... F16J 15/40 277/516 |
| 2,539,996 | A | * | 1/1951  | Gleitz ............... F16J 15/184 277/526 |
| 3,162,454 | A |   | 12/1964 | Englert et al. |
| 3,168,869 | A | * | 2/1965  | Sieghartner ............ F16J 15/184 415/170.1 |
| 4,060,353 | A |   | 11/1977 | Akimoto et al. |
| 4,470,607 | A |   | 9/1984  | Schier et al. |
| 4,795,171 | A | * | 1/1989  | Quevedo Del Rio ............ F04D 29/106 277/512 |
| 4,875,690 | A |   | 10/1989 | Tojo |
| RE37,483  | E |   | 12/2001 | Kennedy et al. |
| 6,502,827 | B1 |  | 1/2003  | Toner |
| 8,047,820 | B2 |  | 11/2011 | Merrick, III |
| 10,670,013 | B2 | * | 6/2020  | Foster ............... F04B 1/0408 |
| 10,941,765 | B2 | * | 3/2021  | Nowell ............... F04B 1/0404 |
| 10,962,001 | B2 | * | 3/2021  | Nowell ............... F04B 1/145 |
| 11,162,479 | B2 | * | 11/2021 | Thomas ............... F04B 47/00 |

(Continued)

*Primary Examiner* — Nicholas L Foster
(74) *Attorney, Agent, or Firm* — Edell, Shapiro & Finnan, LLC

(57) ABSTRACT

A stuffing box assembly for a fluid end of a hydraulic fluid pump includes a first stuffing box member having a first plunger bore configured to receive a plunger of the hydraulic fluid pump and a plurality of seals. The first stuffing box member further comprises a first bore spaced apart from the plunger bore. A second stuffing box member has a threaded stuffing nut bore configured to receive a stuffing nut of the hydraulic fluid pump. The second stuffing box member further comprises a second bore spaced apart from the stuffing nut bore. A fastener is configured to extend through the first and second bores to secure the first stuffing box member to the second stuffing box member.

21 Claims, 11 Drawing Sheets

(56) References Cited

U.S. PATENT DOCUMENTS

| | | | |
|---|---|---|---|
| 2003/0184018 A1* | 10/2003 | Upton | F16J 15/3296 |
| | | | 277/318 |
| 2009/0243223 A1 | 10/2009 | Merrick, III | |
| 2014/0322050 A1* | 10/2014 | Marette | F04B 47/02 |
| | | | 417/437 |
| 2019/0017503 A1* | 1/2019 | Foster | F04B 53/16 |
| 2019/0136842 A1* | 5/2019 | Nowell | F04B 53/16 |
| 2019/0178243 A1* | 6/2019 | Nowell | F04B 1/0404 |
| 2019/0360483 A1* | 11/2019 | Nowell | F04B 1/0448 |
| 2020/0182240 A1* | 6/2020 | Nowell | F16J 15/184 |
| 2020/0232450 A9* | 7/2020 | Nowell | F04B 53/16 |
| 2020/0284253 A1* | 9/2020 | Foster | F04B 1/0421 |
| 2020/0300240 A1* | 9/2020 | Nowell | F04B 1/18 |
| 2020/0400234 A1* | 12/2020 | Mullins | F16J 15/406 |
| 2021/0095650 A1* | 4/2021 | Nowell | F04B 1/0452 |
| 2021/0148208 A1* | 5/2021 | Thomas | F04B 47/00 |
| 2021/0148345 A1* | 5/2021 | Thomas | F04B 53/162 |
| 2021/0148349 A1* | 5/2021 | Nowell | F04B 7/0084 |
| 2021/0190067 A1* | 6/2021 | Nowell | F04B 53/007 |
| 2021/0215154 A1* | 7/2021 | Nowell | F04B 53/22 |

\* cited by examiner

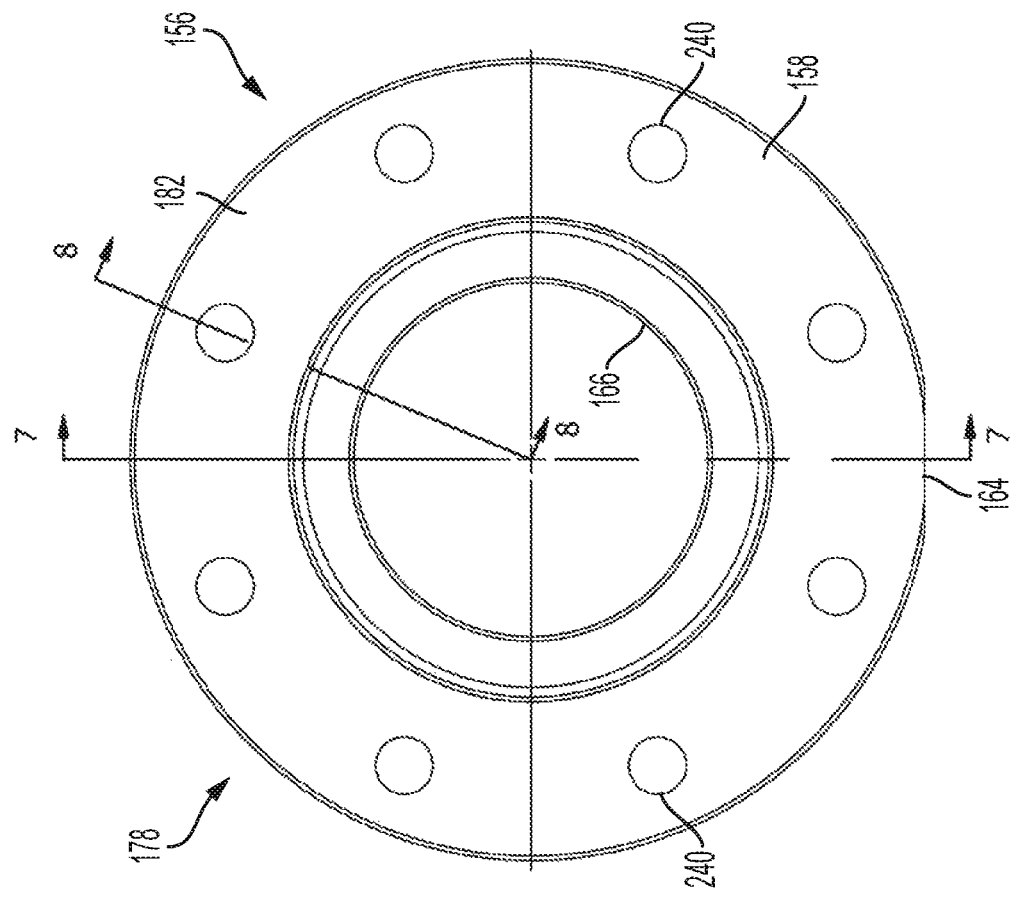

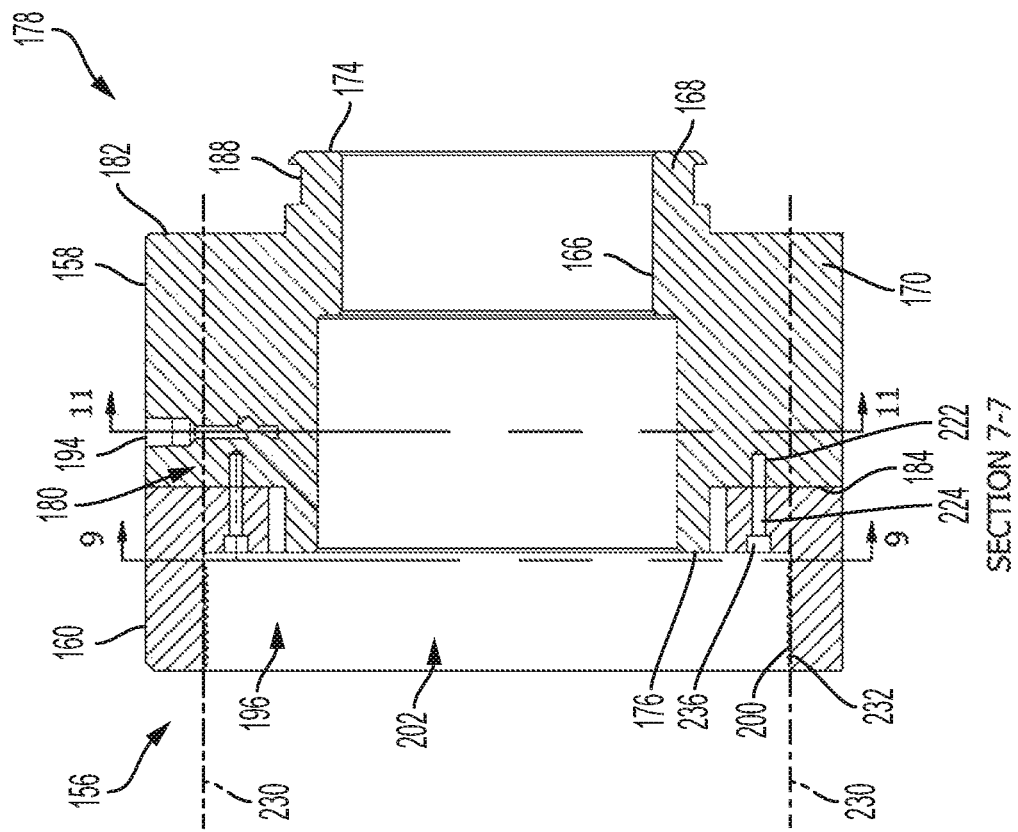

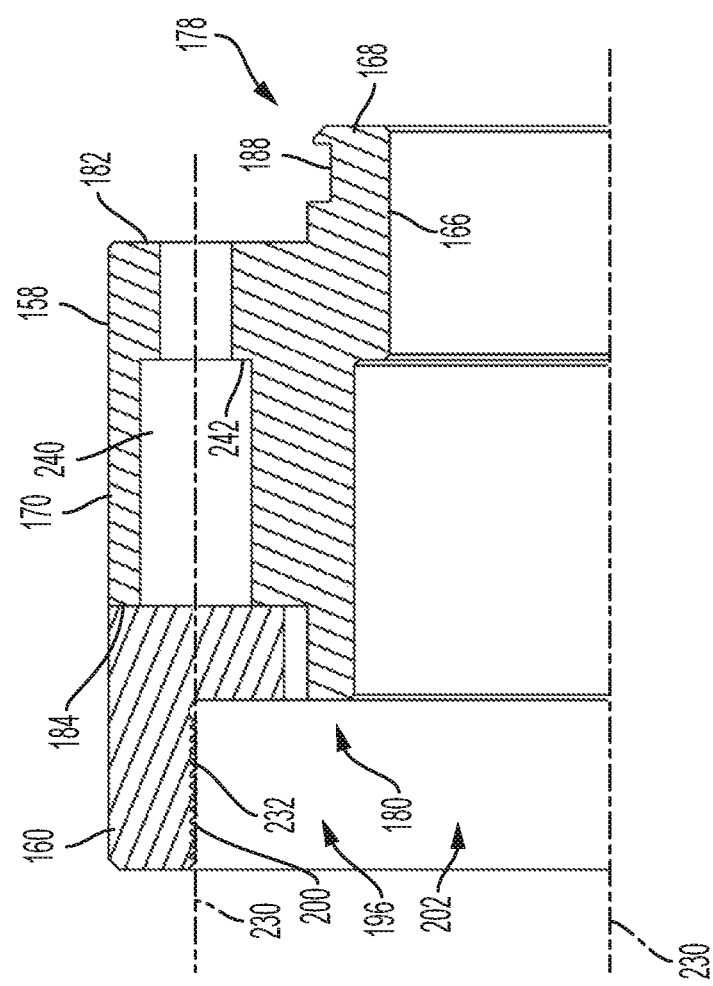

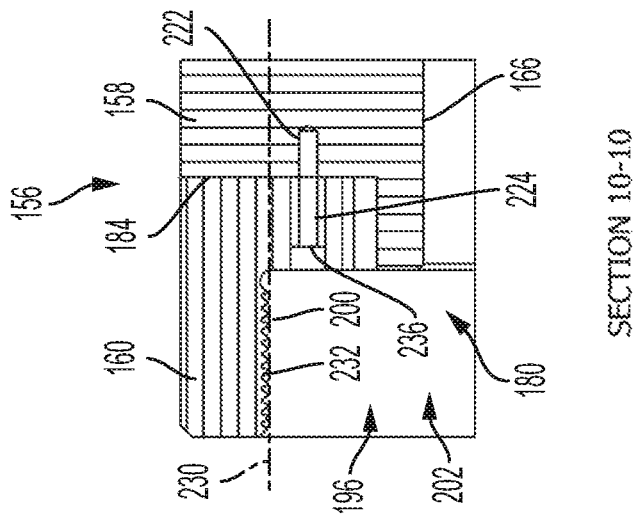
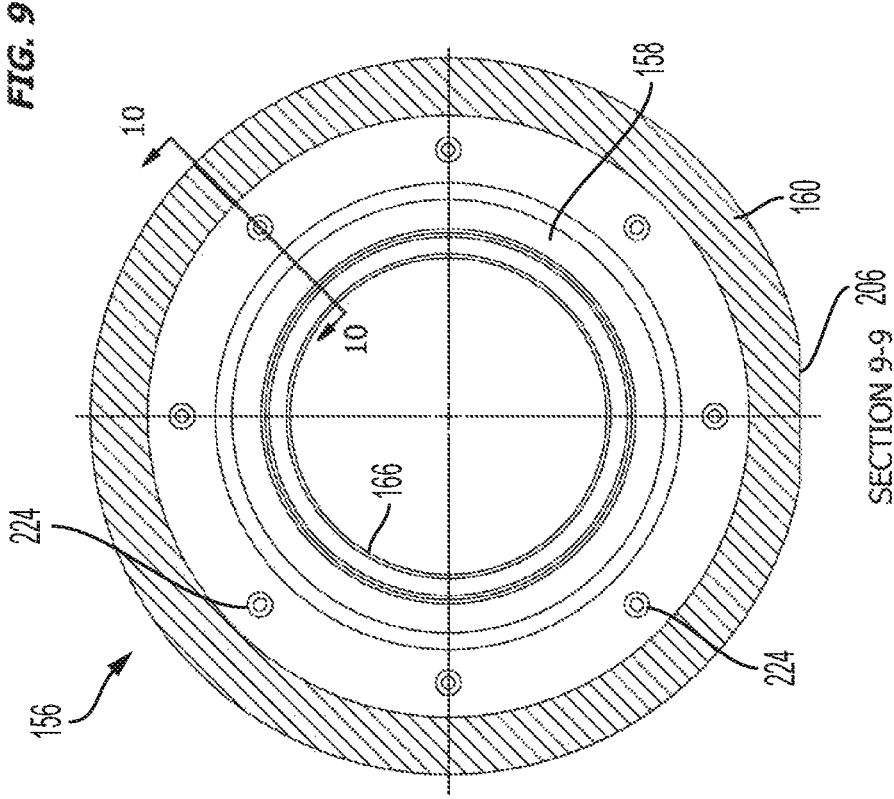

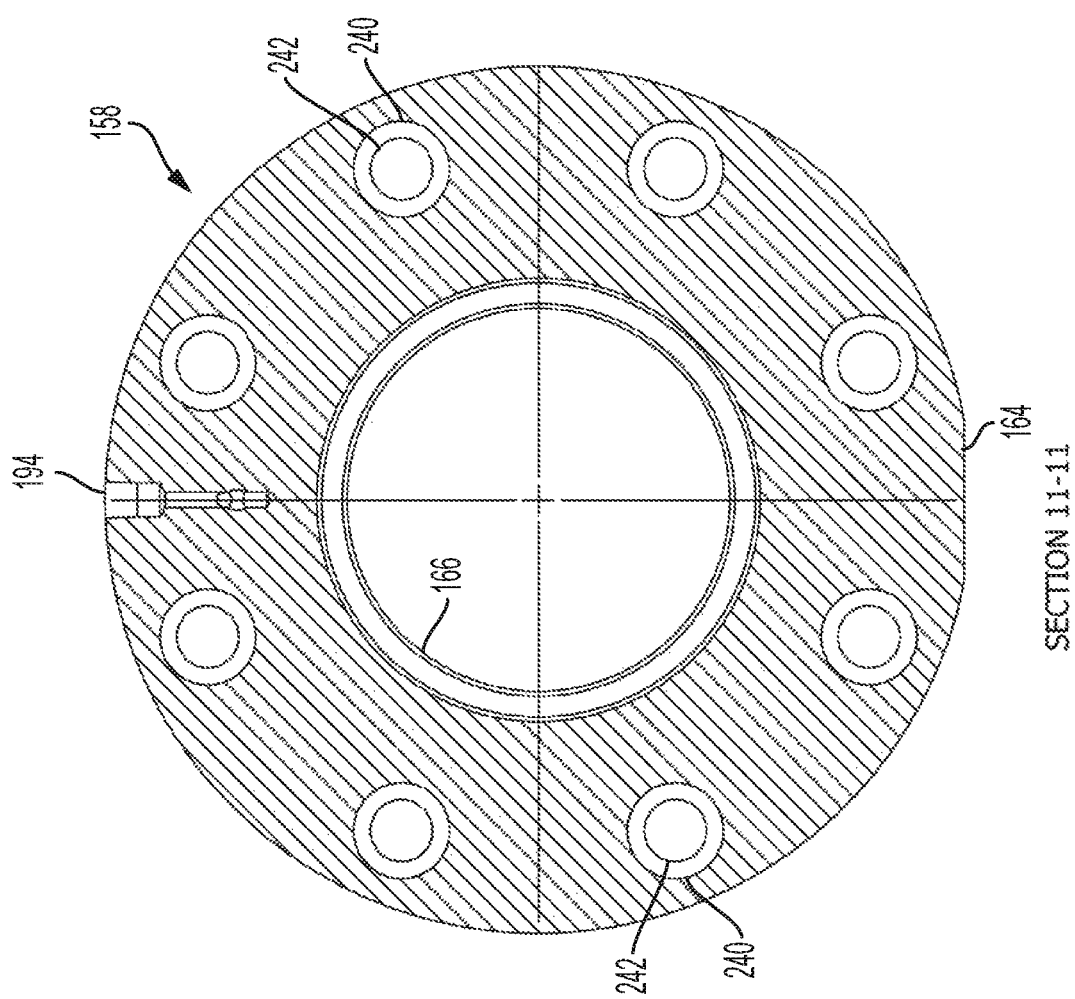

HYDRAULIC FLUID PUMP AND STUFFING BOX ASSEMBLY FOR SAME

FIELD OF THE INVENTION

The present invention relates to a hydraulic fluid pump and, more particularly, to a fluid end assembly and a stuffing box of a hydraulic fluid pump.

SUMMARY

In one embodiment, the invention provides a stuffing box assembly for a fluid end of a hydraulic fluid pump. The stuffing box assembly includes a first stuffing box member having a first plunger bore configured to receive a plunger of the hydraulic fluid pump and a plurality of seals. The first stuffing box member further comprises a first bore spaced apart from the plunger bore. A second stuffing box member has a threaded stuffing nut bore configured to receive a stuffing nut of the hydraulic fluid pump. The second stuffing box member further comprises a second bore spaced apart from the stuffing nut bore. A fastener is configured to extend through the first and second bores to secure the first stuffing box member to the second stuffing box member.

In another embodiment, the invention provides a method of assembling a fluid end assembly of a hydraulic fluid pump. A first stuffing box member is axially abutted against a second stuffing box member such that a plunger bore of the first stuffing box member is aligned with a stuffing nut bore of the first stuffing box member and a first bore is aligned with a second bore. A fastener is inserted into the first and second bores to secure the first stuffing box member to the second stuffing box member. A plurality of seals are inserted into the plunger bore. A stuffing nut is inserted into the stuffing nut bore, thereby applying an axial force on the plurality of seals.

In yet another embodiment, the invention provides a fluid end of a hydraulic fluid pump. The fluid end includes a fluid end housing having a first plunger bore, a first stuffing box member fastened to the fluid end, the first stuffing box member having a second plunger bore coaxial with the first plunger bore, a second stuffing box member fastened to the first stuffing box member, the second stuffing box member having a stuffing nut bore, a stuffing nut extending into the stuffing nut bore and fastened to the second stuffing box member, the stuffing nut having a third plunger bore coaxial with the second plunger bore, and a plunger configured to extend into the first plunger bore, the second plunger bore, and the third plunger bore.

Other aspects of the invention will become apparent by consideration of the detailed description and accompanying drawings.

BRIEF DESCRIPTION OF THE DRAWINGS

FIG. 6 is a rear view of the stuffing box.
FIG. 7 is a cross-sectional view of the stuffing box taken along line 7-7 of FIG. 6.
FIG. 8 is a cross-sectional view of the stuffing box taken along line 8-8 of FIG. 6.
FIG. 9 is a cross-sectional view of the stuffing box taken along line 9-9 of FIG. 7.
FIG. 10 is a partial cross-sectional view of the stuffing box taken along line 10-10 of FIG. 9.
FIG. 11 is a cross-sectional view of the stuffing box taken along line 11-11 of FIG. 7.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
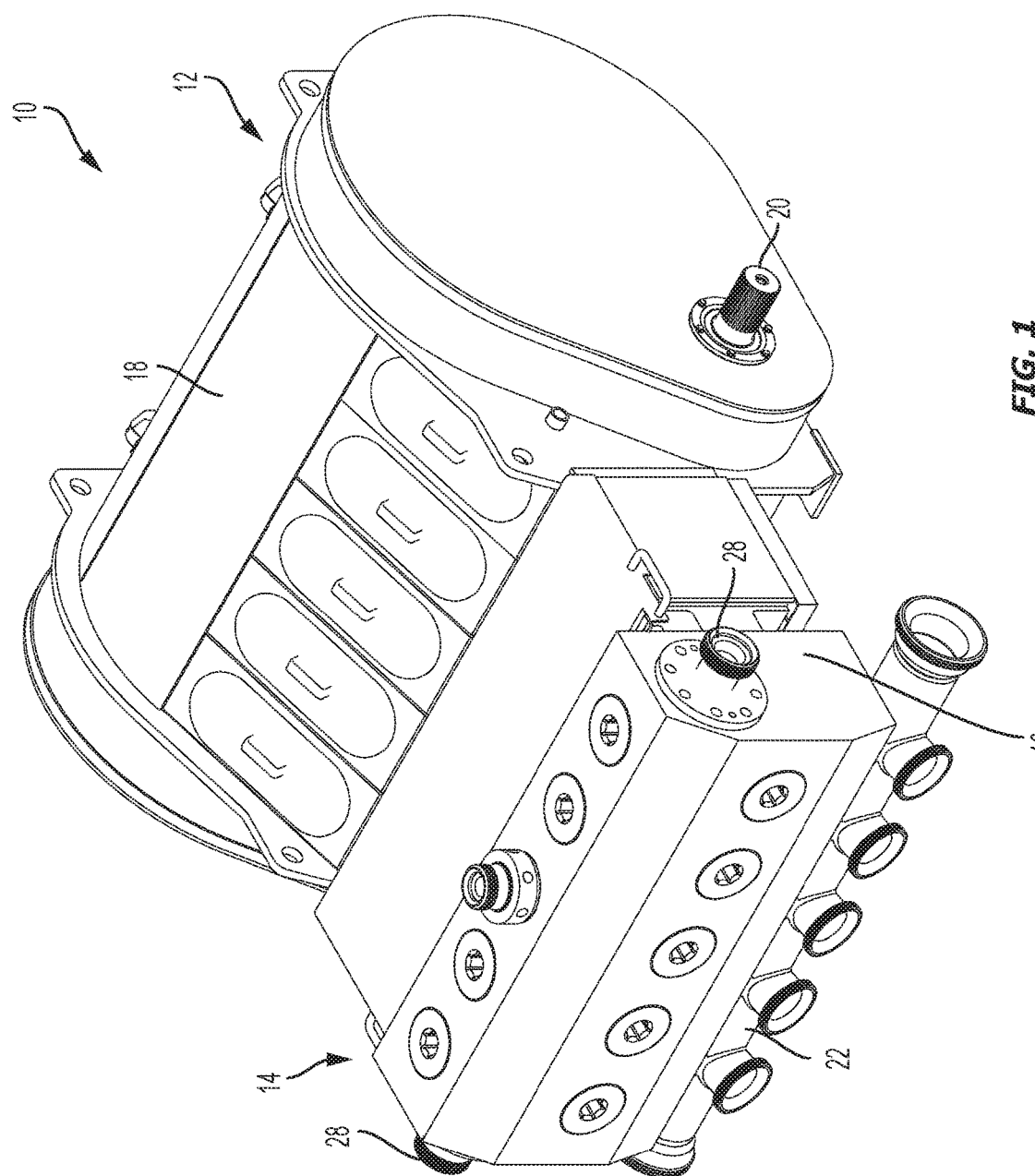
FIG. 1 is a perspective view of a hydraulic fluid pump.

FIG. 1 illustrates a hydraulic fluid pump 10 of the type often used during drilling and hydraulic fracturing operations such as hydrocarbon or oil fracturing. The hydraulic fluid pump 10 includes a power end or drive end or drive end assembly 12 that is largely enclosed within a casing 18. A fluid end or fluid end assembly 14 attaches to the drive end 12 and the casing 18 and includes at least one fluid end block 16. A drive shaft 20 extends out of the casing 18 and provides for a connection point for a prime mover such as a motor or engine. The prime mover drives the drive shaft 20 at a desired speed to power the drive end 12. The drive end 12 typically includes a transmission (e.g., gears, belts, chains, etc.) that serve to step down the speed of the drive shaft 20 to a speed appropriate for the fluid end 14. The drive end 12 includes a series of reciprocating mechanisms that in turn drives a piston or plunger (e.g., plunger 46 shown in FIG. 2) within a respective bore of the fluid end block 16 to pump a fluid.

Figure 2:
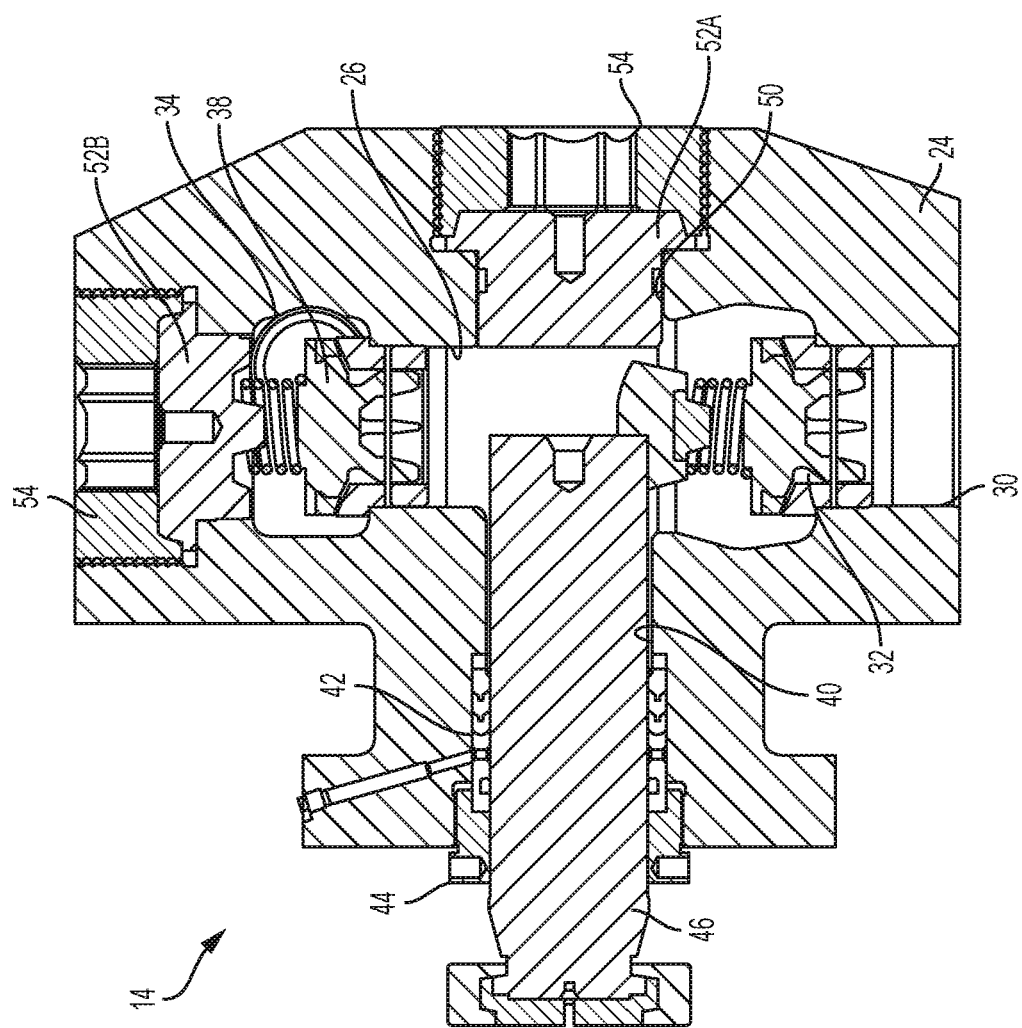
FIG. 2 is a cross-sectional view of a fluid end of a hydraulic fluid pump.

The fluid end 14 is better illustrated in FIG. 2. A housing 24 defines the main body of the fluid end assembly 14 surrounding an interior volume 26. An inlet manifold 22 (FIG. 1) distributes fluid to an inlet bore 30 of each fluid end block 16. An inlet valve 32 is positioned in the inlet bore 30 to control flow from the inlet manifold 22 into the interior volume 26 of the fluid end 14, and more specifically, the interior volume 26 of the housing 24. An outlet bore 34 directs pressurized fluid from the interior volume 26, past an outlet valve 38, and to an outlet manifold integrated into the fluid end 14 and having an outlet 28 (FIG. 1) from the fluid end 14. The outlet manifold 28 is in fluid communication with the fluid end block 16 via the outlet bore 34 and outlet valve 38. As shown, the inlet and outlet bores 30, 34 are axially aligned with one another. In other embodiments, the inlet and outlet bores 30, 34 may be offset from one another or aligned with one another at an angle.

A plunger bore 40 extends perpendicular to the inlet and outlet bores 30, 34 and supports a packing arrangement 42 having a plurality of seals and packing retainer or packing nut or stuffing nut 44. In other embodiments, the plunger bore 40 may be otherwise angled relative to the inlet and outlet bores 30, 34. The reciprocating plunger 46 is movable within the plunger bore 40 relative to the packing arrangement 42 and the packing retainer 44 to pressurize fluid within the interior volume 26 and to the outlet manifold 28. A service bore 50 is formed in the housing 24 parallel with and axially aligned with the plunger bore 40 and provides access to the interior volume 26 of the housing 24 without removal of the plunger 46, or the valves 32, 38. The service bore 50 may additionally provide access for insertion and removal of the plunger 46 and/or the inlet valve 32 from the remainder of the pump 10.

As shown, both the outlet bore 34 and the service bore 50 include valve covers 52A, 52B and retainers 54. The valve covers 52A, 52B seal against the housing 24 to prevent fluid from the interior volume 26 from passing through the respective bores 34, 50. Each retainer 54 applies a force to the respective valve cover 52A, 52B to hold the valve cover 52A, 52B in a sealing position against the housing 24. When the reciprocating plunger 46 increases the pressure of the fluid within the interior volume 26 of the housing 24, a force is applied on the valve covers 52A, 52B. The retainer 54 applies a preload to the valve cover 52A, 52B to counteract the force applied by the pressurized fluid and to prevent unseating of the valve cover 52A, 52B from the housing 24.

Figure 3:
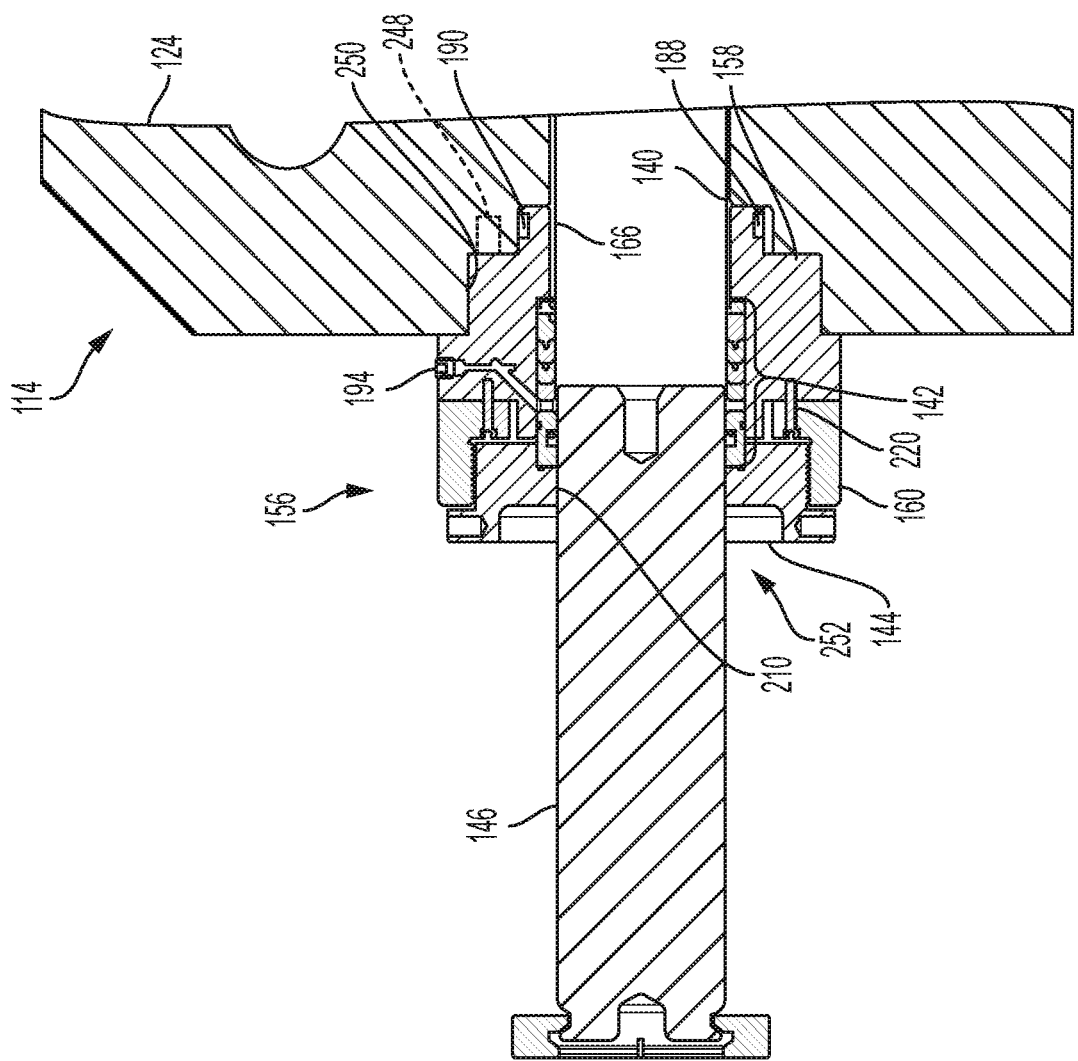
FIG. 3 is a cross-sectional view of a portion of a fluid end with a stuffing box.

FIG. 3 illustrates a cross-sectional view of a stuffing box assembly 156 coupled to a fluid end 114, though only a portion of the fluid end 114 is illustrated. The stuffing box assembly 156 includes a first stuffing box member 158 attached to the housing 124 of the fluid end 114, a second stuffing box member 160 attached to the first stuffing box member 158, and a stuffing nut 144 attached to the second stuffing box member 160.

Figure 4:
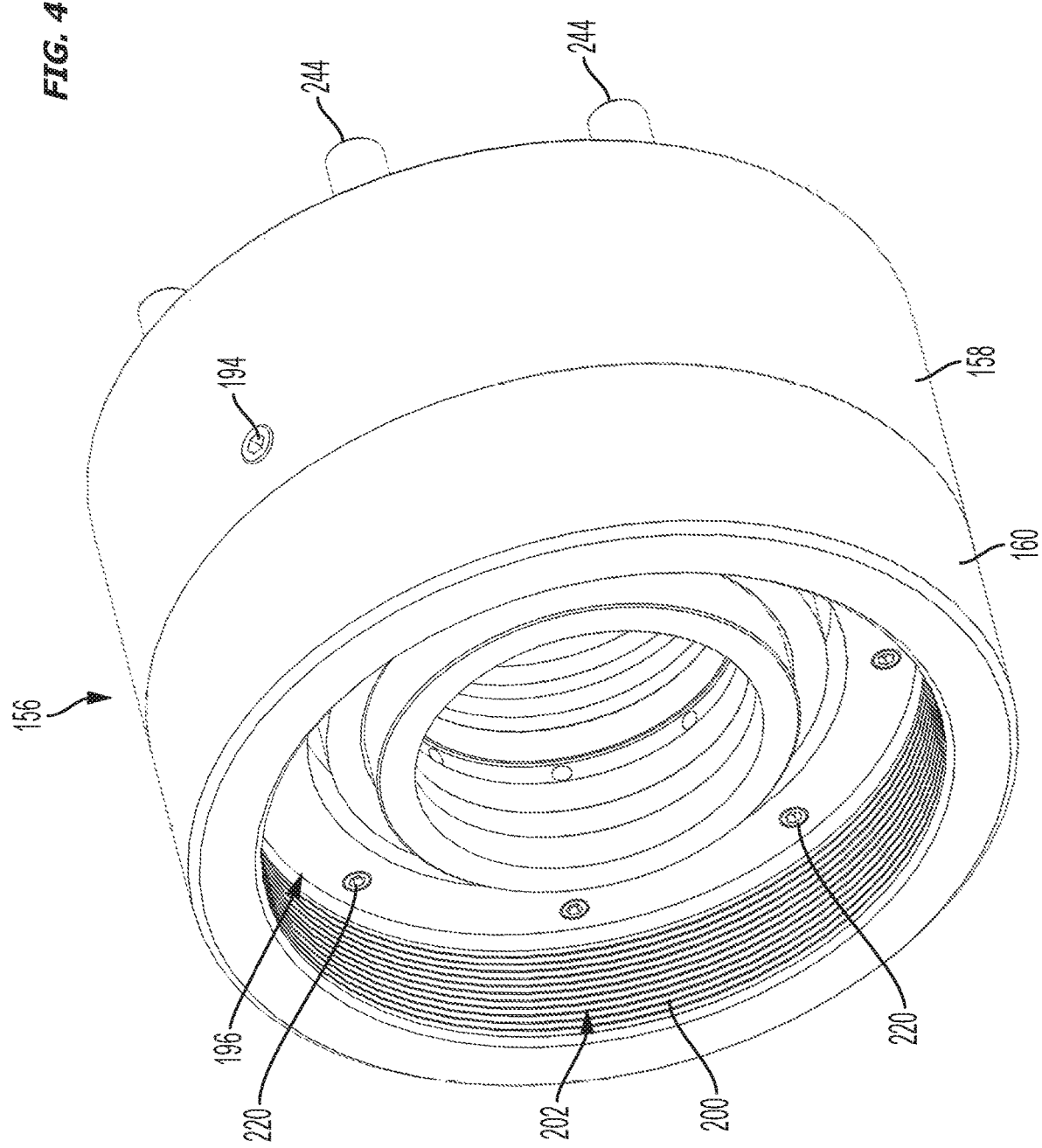
FIG. 4 is a front perspective view of the stuffing box.
Figure 5:
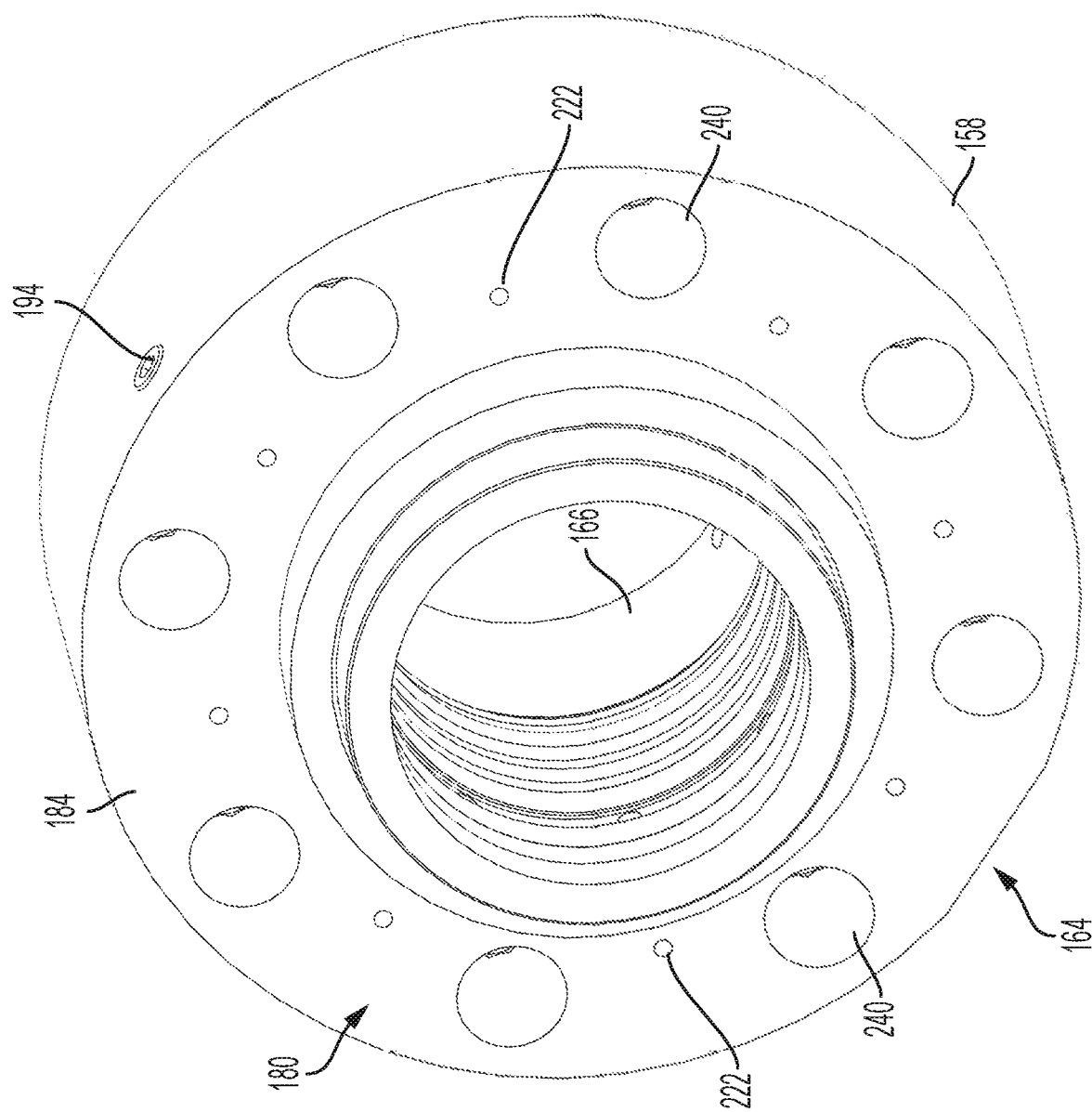
FIG. 5 is a front perspective view of a first stuffing box member of the stuffing box.

As shown in FIGS. 4-6, the first stuffing box member 158 is a substantially cylindrical component having various cylindrical protrusions and bores, which will be described in greater detail below. A flat 164 interrupts the cylindrical outer surface of the first stuffing box member 158 and functions as an alignment feature of the first stuffing box member 158. The outer cross-sectional shape of the first stuffing box member 158 is therefore a circle, abbreviated in size by a chord defining the flat 164. The flat 164 may be formed with the formation (e.g., casting) of the first stuffing box member 158, or may be otherwise formed via a secondary process (e.g., milling).

As shown in FIGS. 7-8, the first stuffing box member 158 further comprises a central bore 166 extending through an axial length of the first stuffing box member 158. The first stuffing box member 158 includes a sealing portion 168 at a first axial extent 174 (FIG. 7) and a packing portion 170 extending from the sealing portion 168 to a second axial extent 176 (FIG. 7). The sealing portion 168 is stepped down in diameter relative to the diameter of the packing portion 170. Therefore, first and second axial ends 178, 180 of the first stuffing box member 158 are non-contiguous, including the axial extents 174, 176, respectively, and further including circumferential portions 182, 184 that are axially offset from the axial extents 174, 176. The sealing portion 168 includes a circumferential groove 188 that supports a seal 190. When the first stuffing box member 158 is assembled with the fluid end housing 124, the seal 190 seals the interface between the plunger bore 140 of the fluid end 114 and the first stuffing box member 158.

The central bore 166 of the first stuffing box member 158 is a second plunger bore, through which the plunger 146 is configured to pass. The central bore 166 is stepped down at a location between the first and second axial ends 178, 180 of the first stuffing box member 158 such that the diameter of the central bore 166 at the first axial end 178 is similar (e.g., the same diameter within machine tolerances) to the diameter of the plunger bore 140 of the fluid end 114. The larger diameter of the central bore 166 (nearer the second axial end 180) is sized to support the packing arrangement 142 such that when the packing arrangement 142 is positioned within the first stuffing box member 158, the plunger 146 is capable of linear translation through the packing arrangement 142.

Referring again to FIG. 3, the packing arrangement 142 includes a plurality of ring or toroid seals in axial abutment with one another. The packing arrangement 142 can include, for example, lantern rings, header rings, junk rings, pressure rings, and support rings. Collectively, the packing arrangement 142 seals the plunger 146 relative to the stuffing box 156. A grease injection port 194 extends substantially radially through the first stuffing box member 158 to the packing arrangement 142.

The second axial end 180 of the first stuffing box member 158 is recessed at the circumferential edge such that the second stuffing box member 160 extends around the first stuffing box member 158 (at the second axial end 180) when assembled. The second stuffing box member 160 has a similar outer diameter as the first stuffing box member 158. The second stuffing box member 160 further defines a central bore 196 that accepts the plunger 146, surrounds a portion of the first stuffing box member 158, and is threaded with internal threads 200 along a portion of the central bore 196. The threaded portion 200 of the central bore 196 defines a threaded stuffing nut bore 202 for threadedly engaging the stuffing nut 144. The second stuffing box member 160 couples to the first stuffing box member 158 and is configured to engage the stuffing nut 144. However, the second stuffing box member 160 itself does not directly define a sealing surface or leak path of the plunger bores 140, 166.

As shown in FIG. 9, the second stuffing box member 160 includes a flat 206 (a chord abbreviating the size of the second stuffing box member 160 at the circumference), similar in size and placement as the flat 164 of the first stuffing box member 158. The flat 206 functions as a second alignment feature that is alignable with the first alignment feature 164. Specifically, when the second stuffing box member 160 is axially abutted against the first stuffing box member 158, the stuffing box members 158, 160 can be rotated relative to one another to align the flats 164, 206 such that the second stuffing box member 160 is rotationally aligned with the first stuffing box member 158. Rotational alignment of the first and second stuffing box members 158, 160 aids in alignment of fasteners 220, as described in greater detail below. In other embodiments, the flats 164, 206 may be replaced be different alignment features, such as, for example, markings or indicia that are aligned with one another. Further still, in some embodiments, the first and second stuffing box members 158, 160 may have no distinct alignment features, instead relying upon a user to insert the fastener 220 through the openings 222, 224 to align the two stuffing box members 158, 160.

Figure 12:
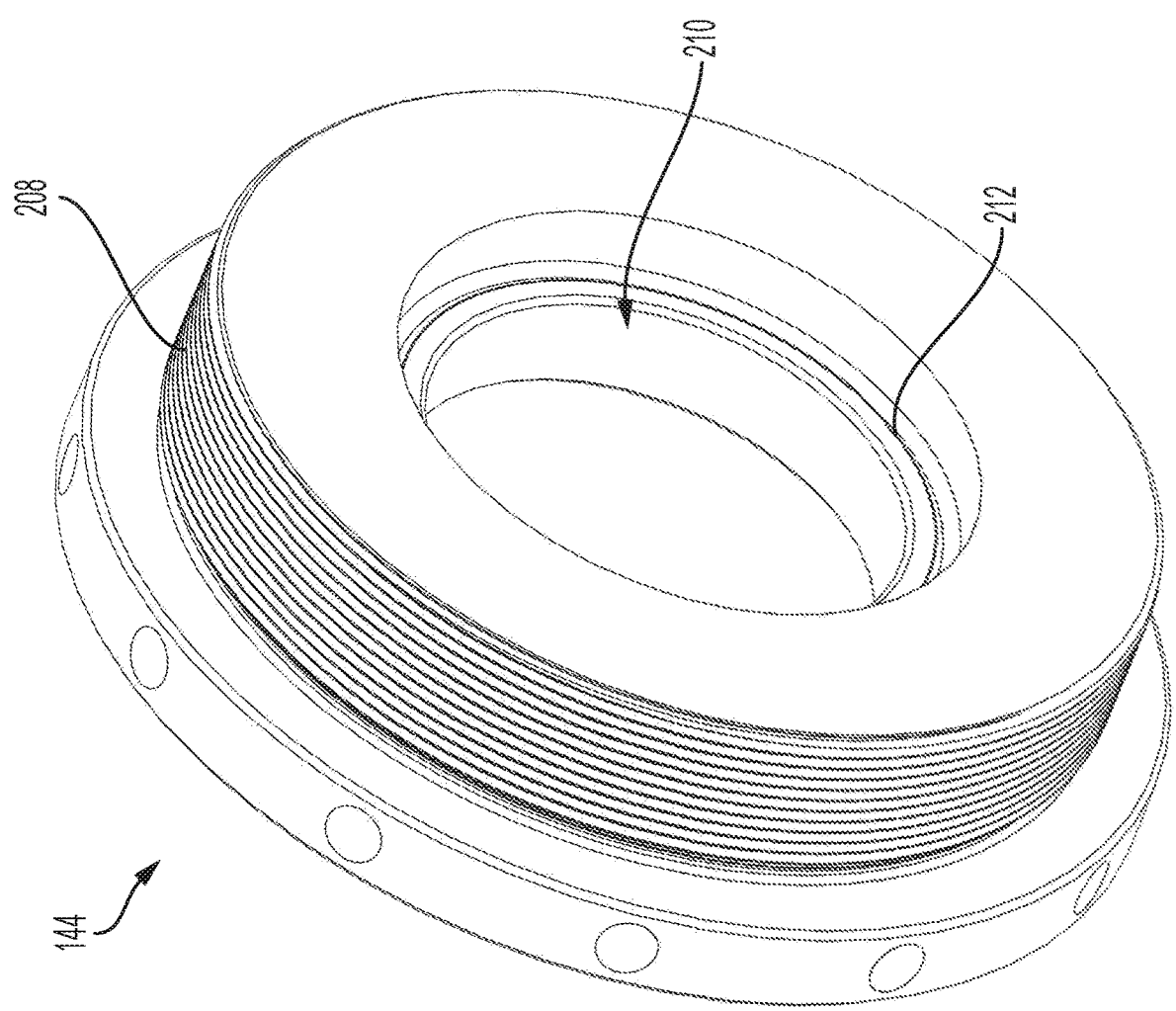
FIG. 12 is a rear perspective view of a stuffing nut.

As shown in FIG. 12, the stuffing nut 144 includes external threads 208 that engage the internal threads 200 of the stuffing nut bore 202 and retain the packing arrangement 142 within the stuffing box 156. Specifically, the stuffing nut 144 includes a central bore 210 stepped to define an abutment surface 212 that presses against the packing arrangement 142 as the stuffing nut 144 is threaded into the stuffing nut bore 202. The central bore 210 is further a plunger bore and is sized to accept movement of the plunger 146 therethrough.

With reference to FIGS. 5, 7, 9, and 10, the first stuffing box member 158 is fastened to the second stuffing box member 160 so that the stuffing nut 144 (which is threaded to the second stuffing box member 160) is fastened to the first stuffing box member 158. A plurality of fasteners 220 (as shown, eight fasteners 220) extend from the second stuffing box member 160 to the first stuffing box member 158 to couple the two stuffing box members 158, 160 together. More specifically, the first stuffing box member 158 includes one or more, and as shown, eight, threaded bores 222 that extend axially (parallel to an axis of the central bore 166) from the second axial end 180 of the first stuffing box member 158 toward the first axial end 178 of the first stuffing box member 158. The bores 222 are threaded to accept threaded fasteners 220. As shown in FIG. 5, the bores 222 are spaced equally about the central bore 166 at a constant radius and offset from one another by a uniform angle of separation (e.g., 45 degrees).

The second stuffing box member 160 further includes a plurality of bores 224, each bore 224 extending axially through the second stuffing box member 160 parallel to an axis of the central bore 196 of the second stuffing box member 160. Each of the plurality of bores 224 is aligned with a respective threaded bore 222 of the first stuffing box member 158. The plurality of bores 224 are located radially inward of the threads 200 for engaging the stuffing nut 144. In other words, the plurality of bores 224 are radially offset from an axis 230 defined by a radial edge 232 of the threaded stuffing nut bore 202 such that the bores 224 do not intersect the axis 230. Therefore, the bores 224 do not need to extend the entire axial length of the second stuffing box member 160 and do not interfere with the threads 200.

When the second stuffing box member 160 is abutted against the first stuffing box member 158 and the first and second alignment features 164, 206 are aligned with one another, each bore 224 of the plurality of bores is aligned with a threaded bore 222 of the first stuffing box member 158. As shown, the plurality of bores 224 are unthreaded. Each of the plurality of bores 224 is sized such that when the fastener 220 is positioned within the bores 222, 224, the fastener 220 is located fully within the respective bores 222, 224 and does not extend into the threaded stuffing nut bore 202. If the fasteners 220 are bolts, each having a bolt head, the bores 224 of the second stuffing box member 160 may be stepped, having an abutment surface 236 against which the head of the respective fastener 220 (or an intermediate washer) abuts when fully threaded into position.

With reference to FIGS. 5, 6, 8, and 11, the first stuffing box member 158 further includes fastener bores 240 extending from the second axial end 180 of the first stuffing box member 158 to the first axial end 178 of the first stuffing box member 158. In other words, the fastener bores 240 extend axially (parallel to the axis of the central bore 166) through the first stuffing box member 158, through the packing portion 170 of the first stuffing box member 158. Similar to the bores 222, 224 associated with coupling the first and second stuffing box members 158, 160 together, the fastener bores 240 are spaced equally about the central bore 166 at a constant radius and offset from one another by a uniform angle of separation (e.g., 45 degrees). Further, the bores 240 include an abutment surface 242 against which a head of a fastener 244 (or an intermediate washer) engages. As shown, the size of the bores 240 is greater than the size of the bores 222, such that larger diameter fasteners 244 may be inserted into the fastener bores 240 than the bores 222, 224. The larger fasteners 244 are utilized to fasten the first stuffing box member 158 (and by extension also the second stuffing box member 160 and the stuffing nut 144) to the fluid end 114.

The fluid end 114 includes a plurality of threaded bores 248, each threaded bore 248 aligned with one of the larger fastener bores 240 of the first stuffing box member 158. The threaded bores 248 surround the plunger bore 140 of the fluid end 114 and are located within a cylindrical recess 250 in the outer wall of the fluid end housing 124. In other embodiments, the fluid end 114 may not have a cylindrical recess 250 and the threaded bores 248 are instead located on a flat exterior surface of the fluid end 114. When the first stuffing box member 158 is abutted into contact with the fluid end 114, the threaded bores 248 are aligned with the bores 240 of the first stuffing box member 148 such that the fasteners 244 are insertable through the first stuffing box member 158 and into the threaded bores 248 of the fluid end 114.

When the first stuffing box member 158 is secured to the second stuffing box member 160, the threaded bores 240 of the fluid end 114 and the bores 240 of the first stuffing box member 158 are intersected by the axis 230 defined by the radial edge 232 of the threaded stuffing nut bore 202. As such, if the first and second stuffing box members 158, 160 were replaced by a single stuffing box member, the threads of the stuffing nut bore would be cut to allow insertion of the fasteners into the fastener bores of the first stuffing box member. By indirectly connecting the stuffing nut 144 to the first stuffing box member 158 via the second stuffing box member 160, the fasteners 244 do not interfere with the threads 200 of the stuffing nut bore 202.

In operation, to assemble the fluid end 114, and specifically, to assemble the stuffing box 156 to the fluid end 114, the fluid end 114 is provided with the threaded bores 248 for receiving the stuffing box 156. A seal 190 is positioned within a circumferential groove 188 on the sealing portion 168 of the first stuffing box member 158 and the first stuffing box member 158 is abutted against the fluid end 114 such that the seal 190 closes the interface between the first stuffing box member 158 and the fluid end 114. In the embodiment shown in FIG. 3, this includes placing the sealing portion 168 of the first stuffing box member 158 within the recess 250 of the fluid end 114 such that the seal 190 is radially compressed. The fastener bores 240 of the first stuffing box member 158 are aligned with the threaded bores 248 in the fluid end 114. Threaded fasteners 244 are inserted through the fastener bores 240 and threaded into the threaded bores 248 until the head of the fastener 244 contacts the abutment surface 242 in the fastener bore 240, thereby fastening the first stuffing box member 158 to the fluid end 114.

The second stuffing box member 160 is then attached to the first stuffing box member 158 by abutting the second stuffing box member 160 against the second axial end 176 of the first stuffing box member 158 and aligning the alignment features 164, 206 with one another. Abutting the stuffing box members 158, 160 against one another covers the fastener bores 240 in the first stuffing box member 158 used to fasten the first stuffing box member 158 to the fluid end 114 and the fasteners 244 positioned therein. Once aligned, fasteners 220 are inserted through the bores 224 in the second stuffing box member 160 and threaded into the threaded bores 222 of the first stuffing box member 158. The fasteners 220 are tightened, thereby locating the threaded stuffing nut bore 202 relative to the first stuffing box member 158 and the plunger bore 166 of the first stuffing box member 158.

The packing arrangement 142 is positioned within the first stuffing box member 158, installed prior to fastening the first stuffing 158 to the fluid end 114, before attaching the second stuffing box member 160 to the first stuffing box member 158, or after attaching the first stuffing box member 158 to the second stuffing box member 160. The packing arrangement 142 is installed in an uncompressed state. Following the packing arrangement 142 within the stuffing box members 158, 160, the stuffing nut 144 is threaded into the threaded stuffing nut bore 202, thereby axially compressing the packing arrangement 142. The stuffing nut 144 is threaded until a desired axial preload is applied to the packing arrangement 142. Threading the stuffing nut 144 into the stuffing nut bore 202 covers the fastener bores 224 in the second stuffing box member 160 that are used to fasten the second stuffing box member 160 to the first stuffing box member 158 and the fasteners 220 positioned therein.

Once the stuffing nut 144 is threaded to the second stuffing box member 160, a plunger bore 252 is defined by the first plunger bore 140 in the fluid end 114, the second plunger bore 166 defined by the first stuffing box member 158 and the packing arrangement 142 positioned therein, and the third plunger bore 210 defined by the stuffing nut 144 threaded within the second stuffing box member 160. A plunger 146 fastened to a drive end (similar to drive end 12) is inserted into the plunger bore 252 for axial movement powered by the drive end (similar to drive end 12) and compression of fluids within the fluid end 114.

In operation, when replacing one or more seals of the packing arrangement 142, the plunger 146 is removed from the plunger bore 252 and the stuffing nut 144 is unthreaded from the stuffing nut bore 202. The packing arrangement 142 may be axially removed from the first stuffing box member 152 through the second axial end 180 of the first stuffing box member 178. The new packing arrangement 142 is inserted through the second axial end 180 of the first stuffing box member 158 and then the stuffing nut 144 is rethreaded into the stuffing nut bore 202 and the plunger 146 is reinserted into the plunger bore 252.

Various features and advantages of the invention are set forth in the following claims.

What is claimed is:

1. A stuffing box assembly for a fluid end of a hydraulic fluid pump, the stuffing box assembly comprising:
    a first stuffing box member having a plunger bore configured to receive a plunger of the hydraulic fluid pump and a plurality of seals, the first stuffing box member further comprising a first bore spaced apart from the plunger bore and a third bore that is spaced apart from the first bore;
    a second stuffing box member having a stuffing nut bore configured to receive a stuffing nut of the hydraulic fluid pump, the second stuffing box member further comprising a second bore spaced apart from the stuffing nut bore;
    a first fastener configured to extend through the first bore and the second bore to secure the first stuffing box member to the second stuffing box member; and
    a second fastener configured to extend through the third bore and into the fluid end to secure the first stuffing box member to the fluid end, wherein the second stuffing box member extends over the third bore to preclude access to the third bore when the first stuffing box member is secured to the second stuffing box member.

2. The stuffing box assembly of claim 1, wherein, when the first bore is axially aligned with the second bore and the plunger bore is axially aligned with the stuffing nut bore.

3. The stuffing box assembly of claim 1, wherein the third bore extends axially through the first stuffing box member between a first axial end and a second axial end, wherein the first axial end is configured to abut the fluid end and the second axial end abuts the second stuffing box member.

4. The stuffing box assembly of claim 3, wherein the first fastener is configured to extend through the second axial end of the first stuffing box member and the second fastener is configured to extend through the first axial end of the first stuffing box member.

5. The stuffing box assembly of claim 1, wherein the third bore is intersected by an axis defined by a radial edge of the stuffing nut bore when the first stuffing box member is secured to the second stuffing box member with the first fastener, the axis extending parallel to a central axis of the stuffing nut bore.

6. The stuffing box assembly of claim 5, wherein the second bore is radially offset from the axis defined by the radial edge of the stuffing nut bore such that the second bore does not intersect the axis.

7. The stuffing box assembly of claim 1, wherein the first bore is a threaded bore.

8. The stuffing box assembly of claim 7, wherein the second bore is an unthreaded bore.

9. The stuffing box assembly of claim 1, further comprising a first alignment feature located on an exterior surface of the first stuffing box member and a second alignment feature located on an exterior surface of the second stuffing box member, wherein the first alignment feature is aligned with the second alignment feature when the first bore is aligned with the second bore.

10. A fluid end of a hydraulic fluid pump, the fluid end comprising:
    a fluid end housing having a first plunger bore;
    a first stuffing box member fastened to the fluid end, the first stuffing box member having second plunger bore coaxial with the first plunger bore, a first bore spaced apart from the second plunger bore, and a third bore that is spaced apart from the first bore;
    a second stuffing box member fastened to the first stuffing box member, the second stuffing box member having a stuffing nut bore and a second bore spaced apart from the stuffing nut bore;
    a first fastener configured to extend through the first bore and the second bore to secure the first stuffing box member to the second stuffing box member;
    a second fastener configured to extend through the third bore and into the fluid end to secure the first stuffing box member to the fluid end, wherein the second stuffing box member extends over the third bore to preclude access to the third bore when the first stuffing box member is secured to the second stuffing box member;
    a stuffing nut extending into the stuffing nut bore and fastened to the second stuffing box member, the stuffing nut having a third plunger bore coaxial with the second plunger bore; and
    a plunger configured to extend into the first plunger bore, the second plunger bore, and the third plunger bore.

11. The fluid end of claim 10, wherein the second fastener is intersected by an axis defined by a radial edge of the stuffing nut bore, the axis extending parallel to a central axis of the stuffing nut bore, and wherein the first fastener is radially offset from the axis defined by the radial edge of the stuffing nut bore such that the first fastener does not intersect the axis defined by the radial edge of the stuffing nut bore.

12. A stuffing box assembly for a fluid end of a hydraulic fluid pump, the stuffing box assembly comprising:
    a first stuffing box member having a plunger bore configured to receive a plunger of the hydraulic fluid pump and a plurality of seals, the first stuffing box member further comprising a first bore spaced apart from the plunger bore and a third bore that is spaced apart from the first bore;

a second stuffing box member having a stuffing nut bore configured to receive a stuffing nut of the hydraulic fluid pump, the second stuffing box member further comprising a second bore spaced apart from the stuffing nut bore;

a first fastener configured to extend through the first bore and the second bore to secure the first stuffing box member to the second stuffing box member; and a second fastener configured to extend through the third bore and into the fluid end to secure the first stuffing box member to the fluid end, wherein the third bore is intersected by an axis defined by a radial edge of the stuffing nut bore when the first stuffing box member is secured to the second stuffing box member with the first fastener, the axis extending parallel to a central axis of the stuffing nut bore.

13. The stuffing box assembly of claim 12, wherein, when the first bore is axially aligned with the second bore and the plunger bore is axially aligned with the stuffing nut bore.

14. The stuffing box assembly of claim 12, wherein the third bore extends axially through the first stuffing box member between a first axial end and a second axial end, wherein the first axial end is configured to abut the fluid end and the second axial end is configured to abut the second stuffing box member.

15. The stuffing box assembly of claim 14, wherein the first fastener is configured to extend through the second axial end of the first stuffing box member and the second fastener is configured to extend through the first axial end of the first stuffing box member.

16. The stuffing box assembly of claim 14, wherein the second stuffing box member extends over the third bore at the second axial end to preclude access to the third bore when the first stuffing box member is secured to the second stuffing box member.

17. The stuffing box assembly of claim 12, wherein the second bore is radially offset from the axis defined by the radial edge of the stuffing nut bore such that the second bore does not intersect the axis.

18. The stuffing box assembly of claim 12, further comprising a first alignment feature located on an exterior surface of the first stuffing box member and a second alignment feature located on an exterior surface of the second stuffing box member, wherein the first alignment feature is aligned with the second alignment feature when the first bore is aligned with the second bore.

19. A fluid end of a hydraulic fluid pump, the fluid end comprising:

a fluid end housing having a first plunger bore;

a first stuffing box member fastened to the fluid end, the first stuffing box member having second plunger bore coaxial with the first plunger bore, a first bore spaced apart from the second plunger bore, and a third bore that is spaced apart from the first bore;

a second stuffing box member fastened to the first stuffing box member, the second stuffing box member having a stuffing nut bore and a second bore spaced apart from the stuffing nut bore;

a first fastener configured to extend through the first bore and the second bore to secure the first stuffing box member to the second stuffing box member;

a second fastener configured to extend through the third bore and into the fluid end to secure the first stuffing box member to the fluid end, wherein the third bore is intersected by an axis defined by a radial edge of the stuffing nut bore when the first stuffing box member is secured to the second stuffing box member with the first fastener, the axis extending parallel to a central axis of the stuffing nut bore;

a stuffing nut extending into the stuffing nut bore and fastened to the second stuffing box member, the stuffing nut having a third plunger bore coaxial with the second plunger bore; and a plunger configured to extend into the first plunger bore, the second plunger bore, and the third plunger bore.

20. The fluid end of claim 19, wherein the second stuffing box member extends over the third bore to preclude access to the third bore when the first stuffing box member is secured to the second stuffing box member.

21. The fluid end of claim 19, wherein the first fastener is radially offset from the axis defined by the radial edge of the stuffing nut bore such that the first fastener does not intersect the axis defined by the radial edge of the stuffing nut bore.

* * * * *